(12) United States Patent
Lepore (10) Patent No.: US 11,598,080 B2
(45) Date of Patent: Mar. 7, 2023

(54) SUMP OVERFLOW PROTECTOR

(71) Applicant: Vincent Lepore, Macomb, MI (US)

(72) Inventor: Vincent Lepore, Macomb, MI (US)

( * ) Notice: Subject to any disclaimer, the term of this patent is extended or adjusted under 35 U.S.C. 154(b) by 0 days.

(21) Appl. No.: 17/345,401

(22) Filed: Jun. 11, 2021

(65) Prior Publication Data

US 2022/0178103 A1 Jun. 9, 2022

Related U.S. Application Data

(60) Provisional application No. 63/092,033, filed on Oct. 15, 2020.

(51) Int. Cl.
*E03F 5/042* (2006.01)
*E03F 5/04* (2006.01)
*E02D 31/02* (2006.01)

(52) U.S. Cl.
CPC .............. *E03F 5/042* (2013.01); *E02D 31/02* (2013.01); *E03F 5/0407* (2013.01)

(58) Field of Classification Search
CPC ........... E03F 5/042; E03F 5/0407; E03F 5/12; E02D 31/02
See application file for complete search history.

(56) References Cited

U.S. PATENT DOCUMENTS

| 3,562,982 | A | * | 2/1971 | Parezo | E04B 1/703 |
| | | | | | 52/302.3 |
| 3,998,736 | A | | 12/1976 | Greenleaf, Jr. | |
| 4,553,561 | A | * | 11/1985 | Morris | E03F 5/12 |
| | | | | | 417/40 |
| 5,007,451 | A | * | 4/1991 | Bralich | E03F 7/00 |
| | | | | | 417/41 |
| 5,069,243 | A | | 12/1991 | Foreman | |
| 6,712,553 | B1 | | 3/2004 | Niedermeyer | |
| 6,766,620 | B2 | * | 7/2004 | Robbins | E02D 31/10 |
| | | | | | 405/36 |
| 2006/0096186 | A1 | * | 5/2006 | Safie | E02D 29/0258 |
| | | | | | 52/169.5 |
| 2013/0284679 | A1 | * | 10/2013 | Bailin | C02F 1/004 |
| | | | | | 210/416.1 |
| 2019/0177963 | A1 | * | 6/2019 | Brant | E03F 7/00 |

* cited by examiner

*Primary Examiner* — Carib A Oquendo
(74) *Attorney, Agent, or Firm* — Gregory Ozga; Warn Partners, P.C.

(57) ABSTRACT

A sump overflow protection system for use in a building having a floor and a drainage field for collecting water from the perimeter of the building. The sump overflow protection system includes a portion of the floor proximal an opening of a sump crock having a first level defining a base and wherein the rest of the bottom floor generally has a second level higher than the first level of the basin surface of the floor and communicates water overflowing the sump crock to an outlet coupled to a building drainage outlet separate from the sump crock and to be located in the basin surface of the floor and spaced a predetermined distance from the sump crock.

6 Claims, 10 Drawing Sheets

SUMP OVERFLOW PROTECTOR

CROSS-REFERENCE TO RELATED APPLICATIONS

This application is a non-provisional application and claims benefit of U.S. Provisional Patent Application No. 63/092,033; filed Oct. 15, 2020. The disclosure of the above application is incorporated herein by reference.

FIELD OF THE INVENTION

The present disclosure relates to devices and designs for preventing the overflow of water from a sump crock in a floor of a bottom level of a building. More particularly, the present disclosure relates to a building sump overflow protector design and device for same.

BACKGROUND OF THE INVENTION

Generally, it is known to provide a sump pump within a sump crock, tank or pit and a sump pump in a bottom floor of a building for collecting ground water from the foundation of the building and any tile field and wherein the sump includes a pump for pumping the collected water in the sump outside of the building. It is known to include a pump and electric motor for operating the pump and having an outlet coupled to a pipe, conduit, hose, etc. for conveying the collected water out of and away from the building and its foundation (i.e., so the removed water will not return and again be collected by the foundation and/or the tile field of the building.

The known devices and designs vary a great deal and may include many types of modalities for attempting to prevent a sump crock from overflowing and flooding a bottom floor (e.g., basement) of a building (e.g., structure, house, home, etc.). For example, see U.S. Pat. Nos. 3,998,736; 4,553,561; 5,007,451; 5,069,243; and 6,712,553, each of which disclose alternative designs and devices for warning and/or attempting to prevent (or contain) an overflow of water from a sump crock in the floor of the building. The known prior examples for addressing water overflow in a sump installation remain unsatisfactory and riddled with problems and fail to provide an effective solution since they continue to rely on traditional modalities having known failure designs and devices. Several of the examples require a continuous supply of electricity and battery backup to operate a sump pump. When operating properly the sump pump will remove the drain water from the sump crock in the generally known manner. However, if the system fails some of the known designs and devices attempt to contain the sump water above the floor of the building, requiring complex devices and seals which are known to be prone to failing over time. Numerous other problems with the know devices have been noted over a long period of time yet they remain.

There long remains a continuing and significant need to provide an improved sump overflow protection device and design. There remains a continuing and significant need to provide an improved sump overflow protection device and design having improved performance and modalities of operation that eliminate the need for any electrical or other power supply and eliminate the storage of sump overflow water above the floor while also reducing the cost and complexity.

SUMMARY OF THE INVENTION

In one embodiment, there is disclosed a sump overflow protector for use in a building having a bottom floor and a drainage field for collecting drainage water from the perimeter of the building. There is also disclosed a sump overflow protector including a sump overflow basin for collecting overflow drain water from the sump crock, tank or pit and directing it to a sump overflow basin outlet which may be coupled to a drainage field for use in a building having a bottom floor.

There is also disclosed a method of manufacturing and/or installing a sump overflow protector in a floor of a building including the steps of forming a sump pump overflow basin proximal a sump crock and including a wall for separating the sump overflow basin from the rest of the floor and a sump overflow basin outlet located distal the sump crock and providing a drain in the sump overflow basin of the sump overflow protector for communicating overflow water from a sump crock to the drain and wherein the drain conveys water to the drain water sewer of the building. These and other embodiments and benefits of the present disclosure will become better understood in view of the detailed description and the attached figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The present disclosure relates generally to solutions for use in a sump in a building. The general operation, design and use of a water sump in a building is understood. The inclusion of a sump pump for removing water from the sump or sump crock, tank or pit may also be of any know or appropriate type or standard.

Referring in general to all of the drawings, and in particular to FIGS. 1-5, there is disclosed a sump overflow system 10a, 10b for use in a building 11 having a plurality of walls 12a, 12b and a floor 14. Typically, the floor 14 is a basement floor, however, it can be any floor where there is a drainage field 13 (shown in FIG. 7) that can be tiles, pipes, etc. that collect water from the perimeter of the building 11 and drain to a sump crock 20 through an inlet 24. The sump overflow protection device 10a, 10b is effective for containing water overflowing from the sump crock 20 to a sump overflow basin 26a, 26b having a basin floor 16 for conveying, containing, communicating, or otherwise directing the overflowing water from the sump crock 20 to a sewer system 48 that is coupled to the sump overflow system 10a, 10b as further described herein. In the current embodiments, the sump overflow system 10a, 10b includes an opening 44 for communicating any overflow water to a pipe or conduit 42 that optionally leads to a trap 45 and onto the sewer system 48 by the overflow system 10a, 10b. The trap 45 prevents unwanted smells from in through the conduit 42. Also, all embodiments of the present invention optionally include a back flow valve 46 that is a one way valve that will close and prevent the back flow of water and sewage from the sewer system 48.

In the embodiments shown in FIGS. 1-5 of the present disclosure, the sump overflow system 10a, 10b has includes the sump overflow basin 26a, 26b both of which include basin floor 16 that circumscribe an opening 22 of the sump crock 20 and further have a surface that is lower in depth than the surface of the floor 14 to form the sump overflow basin 26a, 26b. The basin floor 16 includes an outlet 40 including the pipe or conduit 42 having the opening 44. The outlet 40 may preferably be aligned and located proximal the opening 22 of the sump 20. It is preferred that the outlet 40 may preferably be located a limited distance from the opening 22 of the sump 20 so that any water overflowing the opening 22 of the sump 20 need only travel a limited distance across the basin floor 16 to opening 44 of the outlet 40. In a preferred embodiment of the invention the outlet 40 is located at a distance of 12 inches or less from the edge of the opening 22 of the sump 20. While 12 inches or less are described it is within the scope of the invention for the distance to be greater depending on the needs of a particular application.

Figure 1:
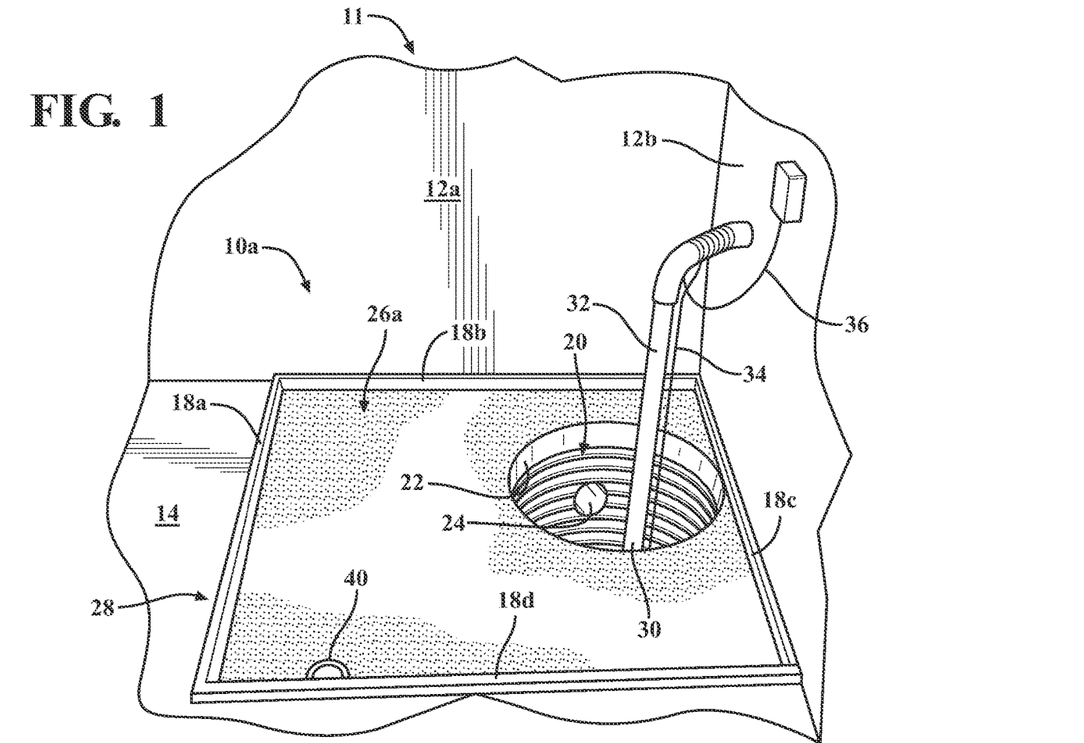
FIG. 1 is a perspective view of a sump overflow protector design in a bottom floor of a building according to a first embodiment of the present invention.
Figure 2:
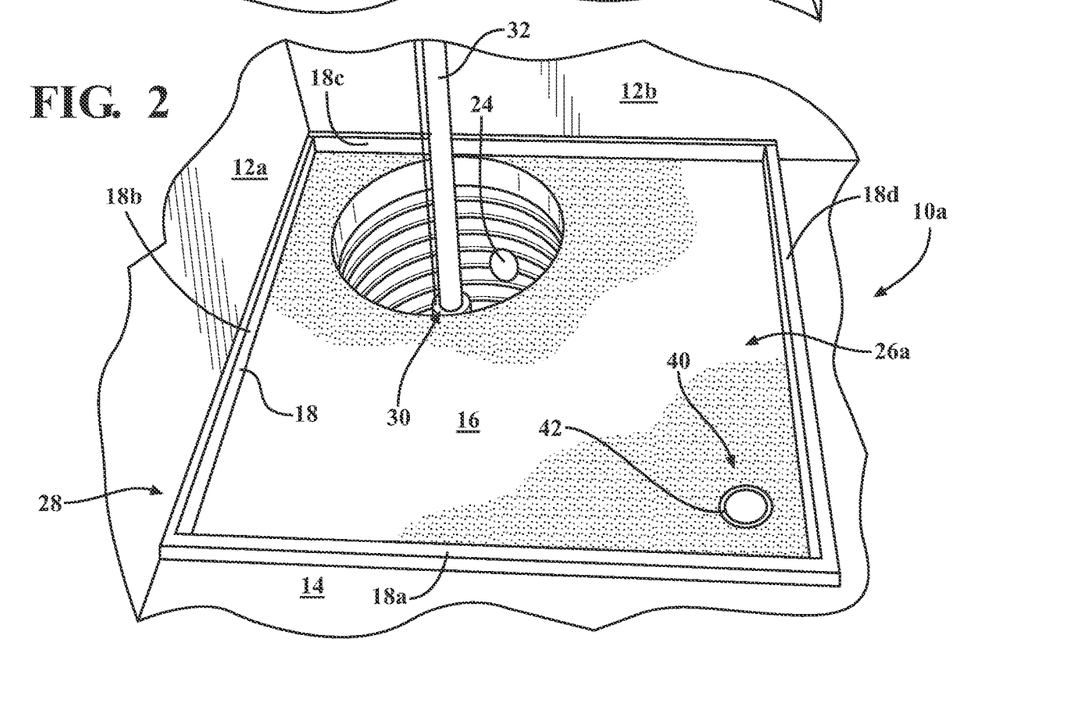
FIG. 2 is a second, perspective view of the sump overflow protector design of FIG. 1.
Figure 3:
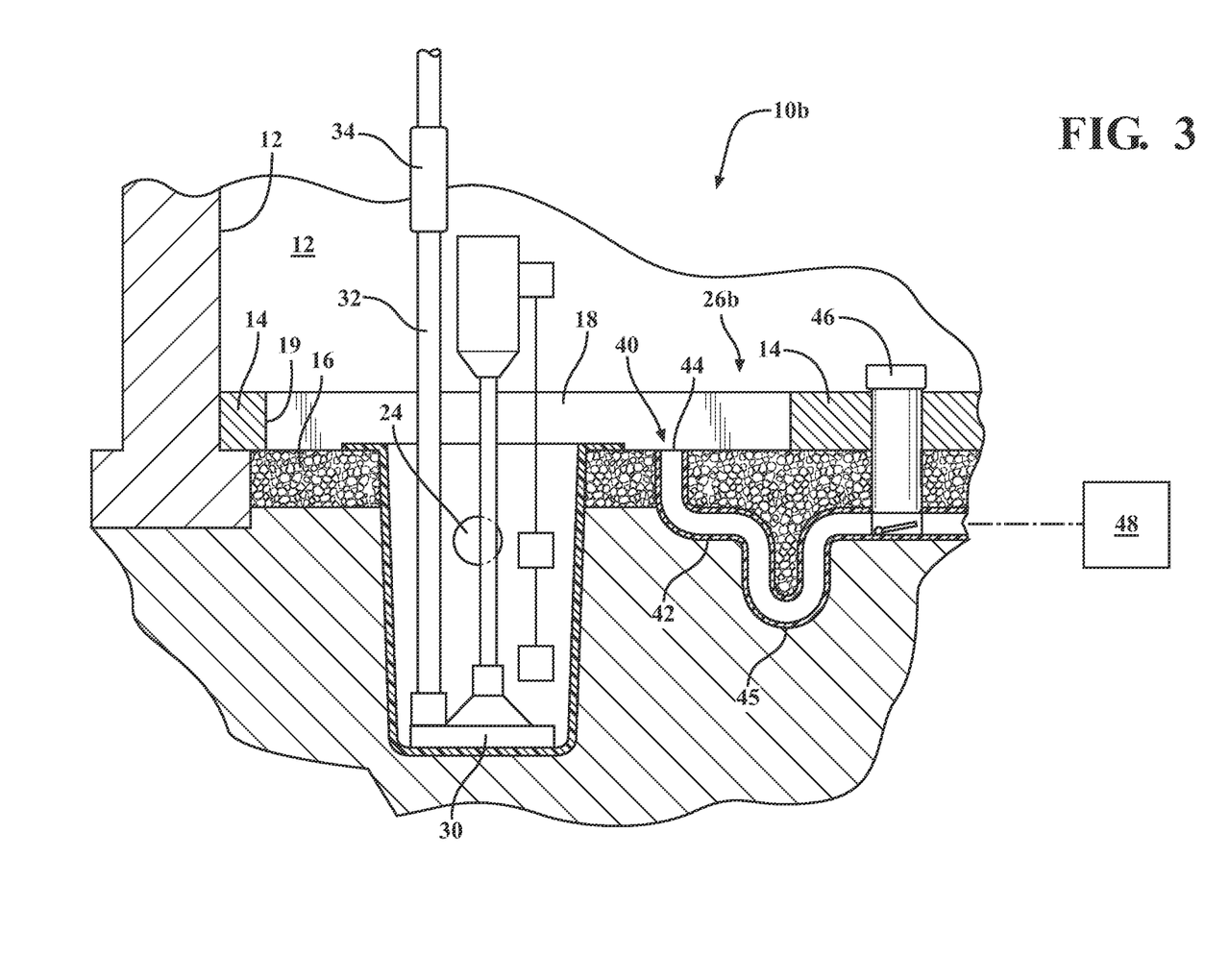
FIG. 3 is a partial, cross-section view of the design of the sump overflow protection circuit according to a second embodiment of the present invention.
Figure 4:
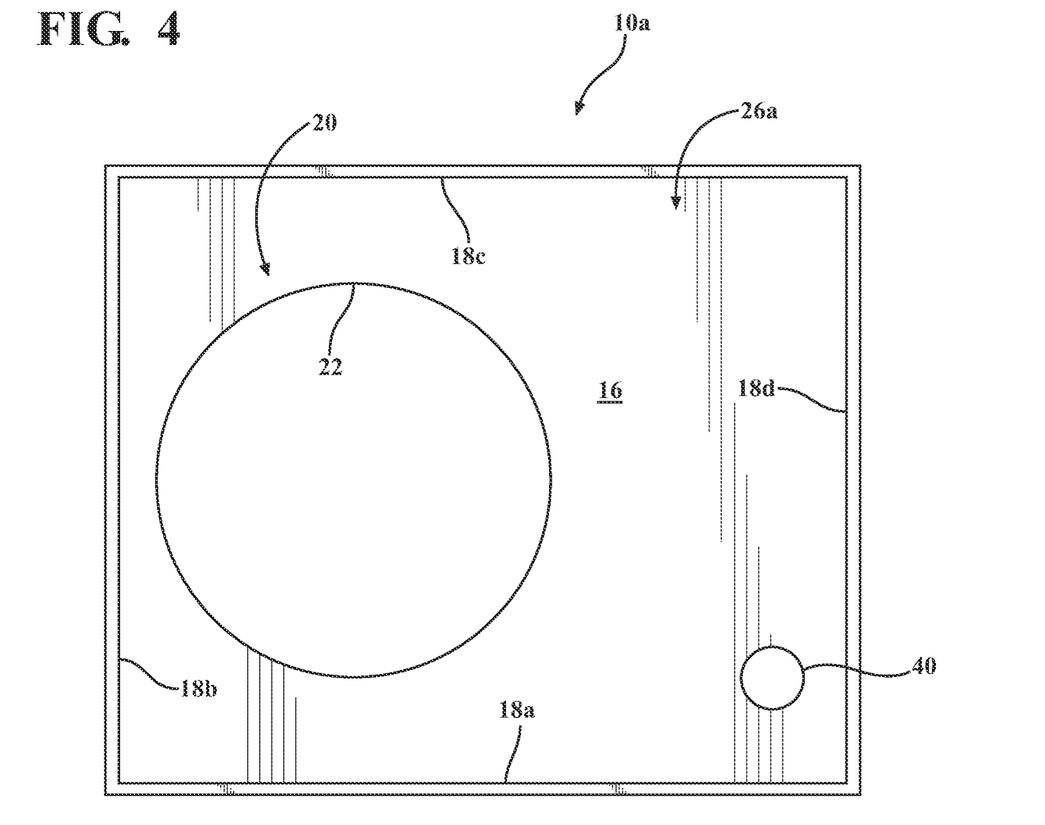
FIG. 4 is a top plan view according to the first embodiment of the present invention.
Figure 5:
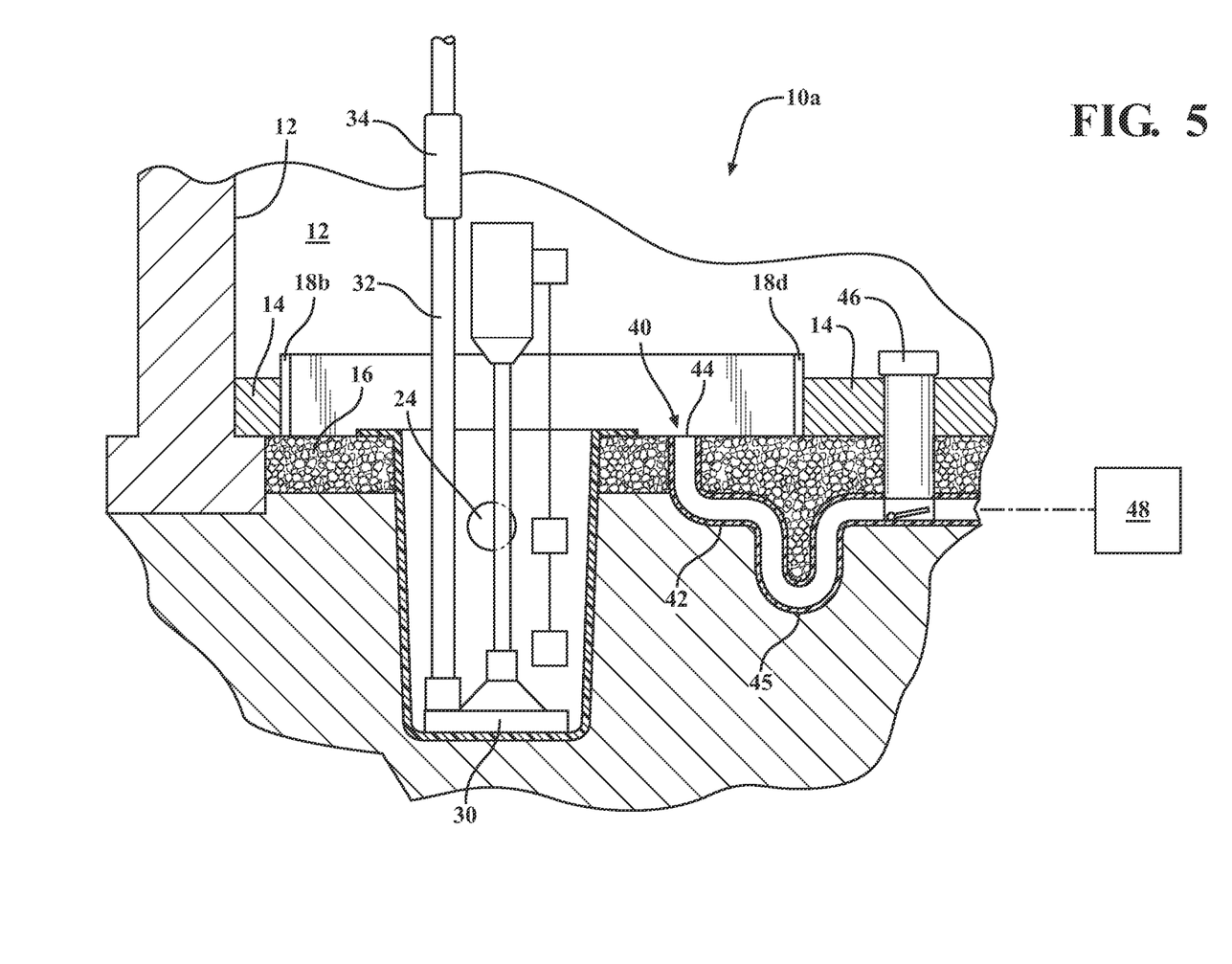
FIG. 5 is a partial, cross-section view of the design of a sump overflow protection circuit according to the present invention.

The sump crock 20 may be located in the basin floor 16 of the floor 14 proximal walls 12 of the building 11. As shown in FIG. 3, the sump crock 20 includes the inlet 24 for receiving water collected from drainage field that includes a drainage or tile field (not shown) located about the perimeter of the building 11 that conveys water to the sump crock 20 where the water collects over time. The sump crock 20 includes the opening 22 in the basin floor 16 of the floor 14. The sump crock 20 also includes a sump-pump 30 including an outlet pipe or conduit 32 and having a check (or one way) valve 34 as may be of any known or appropriate type or design as may be understood. In all embodiments of the present invention conduit 42 of the sump overflow system 10a, 10b, 100, 200, 300, 400, 500 the is separate from the conduit 32 that is connected to the sump pump 30 (not shown in all figures but can be present). The sump pump 30 is electrically powered via the power cord 36 as best shown in FIGS. 1, 2, 3, 5 and 6; but can also operate using a different power source such as a battery power source. While FIGS. 1, 2, 3, 5 and 6 all show the details of the sump pump 30, the other figures have omitted showing the sump pump 30 and related components for purposes of showing the details of the different embodiments of the sump overflow system. It is within the scope of the invention for the other embodiments shown in all of the figures to have a sump pump 30 and related components depending. While the present embodiment discloses that the sump 20 is located proximal a corner defined by two walls 12a, 12b (one of which is an outside) of the building 11, it is expressly contemplated that the sump 20 may be located anywhere lithe floor 14 within the building 11. The present invention is related to a solution to address sump crock water overflow independent of the design or details of the sump pump 30 and its related aspects and components. In other words, the present invention can be implemented with almost any sump pumps, sump crocks and drain field designs where it is possible for water to back up onto a floor of a building. Accordingly, the sump overflow system 10a, 10b of the present disclosure is designed or configured to generally correspond with the design and configuration of the sump crock 20 and its surrounding structures.

Referring now to FIGS. 1, 2, 4 and 5 the sump overflow system 10a, 10b of the present disclosure further includes a sump overflow basin 26a, 26b. The embodiments shown in FIGS. 1, 2, 4 and 5 show the sump overflow basin 26a having a plurality of extension members 18a, 18b, 18c, 18d that are walls, partitions, fences, and dividers that extend past the height of the surface of the floor 14 and define a perimeter 28 of the sump overflow basin 26a. The sump overflow basin contains both the opening 22 of the sump crock 20 and the opening 44 of the conduit 42 of the outlet 40. The sump overflow basin 26b in FIG. 3 contains all the same elements but does not have extension members 18a, 18b, 18c, 18d and instead the top surface of the floor 14 is higher than the top surface of the basin floor 16 with the two different planes being separated by a wall 19. While the extension members 18a, 18b, 18c, 18d of FIGS. 1,2,3,4 and 5 have a generally rectangular or square configuration, it is contemplated that the extension members 18a, 18b, 18c, 18d of the overflow basin 26a of the sump overflow system 10a, 10b have alternative shapes and designs, including a single shaped (circular, oval, curvilinear, etc.) extension members 18a, 18b, 18c, 18d encircling the opening 22 and the outlet 40. In the present disclosure, the extension members 18a, 18b, 18c, 18d of the sump overflow system 10a may be made from any known or appropriate material such as being formed in the concrete of the floor 14 during construction of the building 11 to define the basin floor 16 having a level offset from the level of the floor 14. The basin floor 16 may have a generally planar extent and may also have a slight variation in its pitch to contain and direct water overflowing from the opening 22 of the sump 20 toward the opening 44 of the outlet 40. While the extension members 18a, 18b, 18c, 18d of the basin 26a of the sump overflow system 10a may be directly formed in the concrete of the floor 14 or extension members 18a, 18b, 18c, 18d are made of wood and included in the floor 14.

Figure 6:
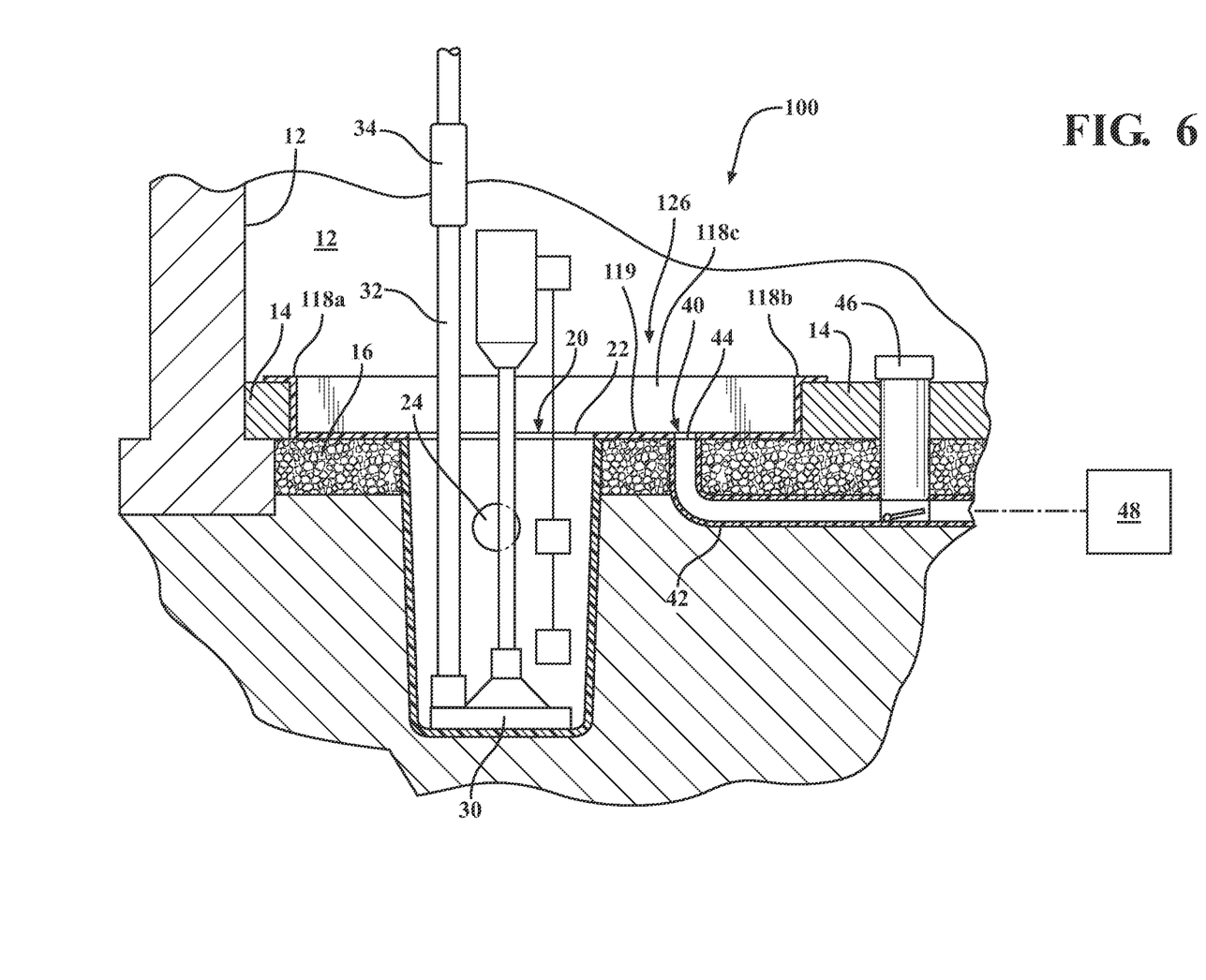
FIG. 6 is a partial, cross-section view of the design of a sump overflow protection circuit according to the present invention.

Referring now for FIG. 6 there is a sump overflow system 100 that that includes a sump overflow basin 126 that is a single piece unit with a floor 119 that is placed on top of the basin floor 16. The sump overflow basin 126 has extension members 118a, 118b, 118c that are integrated with the sump overflow basin 126. It is also contemplated that there is additional extension members 118a, 118b, 118c depending on the shape of the sump overflow basin 126. Additionally, the extension members 118a, 118b, 118c can have a height that extends above the top surface of the floor 14. basin floor It is expressly contemplated that the sump overflow system 10a, 10b and 100 may be incorporated and installed in the building 11 in a variety of manners. It is notable that the primary focus of the solution provided is the forming of a basin floor 16 having a level different than the level of the floor 14 and including the outlet 40 in the basin floor 16, as well as the inclusion in formation and/or installation of the extension members 18a, 18b, 18c, 18d, 118a, 118b, 118c to define the sump overflow basin 26, 126 for receiving and containing overflow water from the sump 20. This way overflow water may be directed, communicated, conveyed to the opening 44 of the outlet 40, where the water enters a pipe 42 where it exits the building 11 and is optionally conveyed or received by a sewer system 48. Many building codes have disallowed locating a floor drain (like the outlet 40) in the sump (like sump crock 20). By forming, installing, providing, creating, etc. a different level basin floor 16 (preferably the level of the basin floor 16 is lower than the rest of the floor 14) and defining the sump overflow basin 26, 126 the outlet 40 may be located more proximal the sump crock 20 and within the sump overflow basin 26 such that overflowing water from the sump 20 may be contained, conveyed, directed, communicated, transferred, etc. to the outlet 40 of the sump overflow system 10a, 10b, 100 wherein the water will be moved away from the building 11 and the overflowing water will not reach the floor 14.

Figure 7:
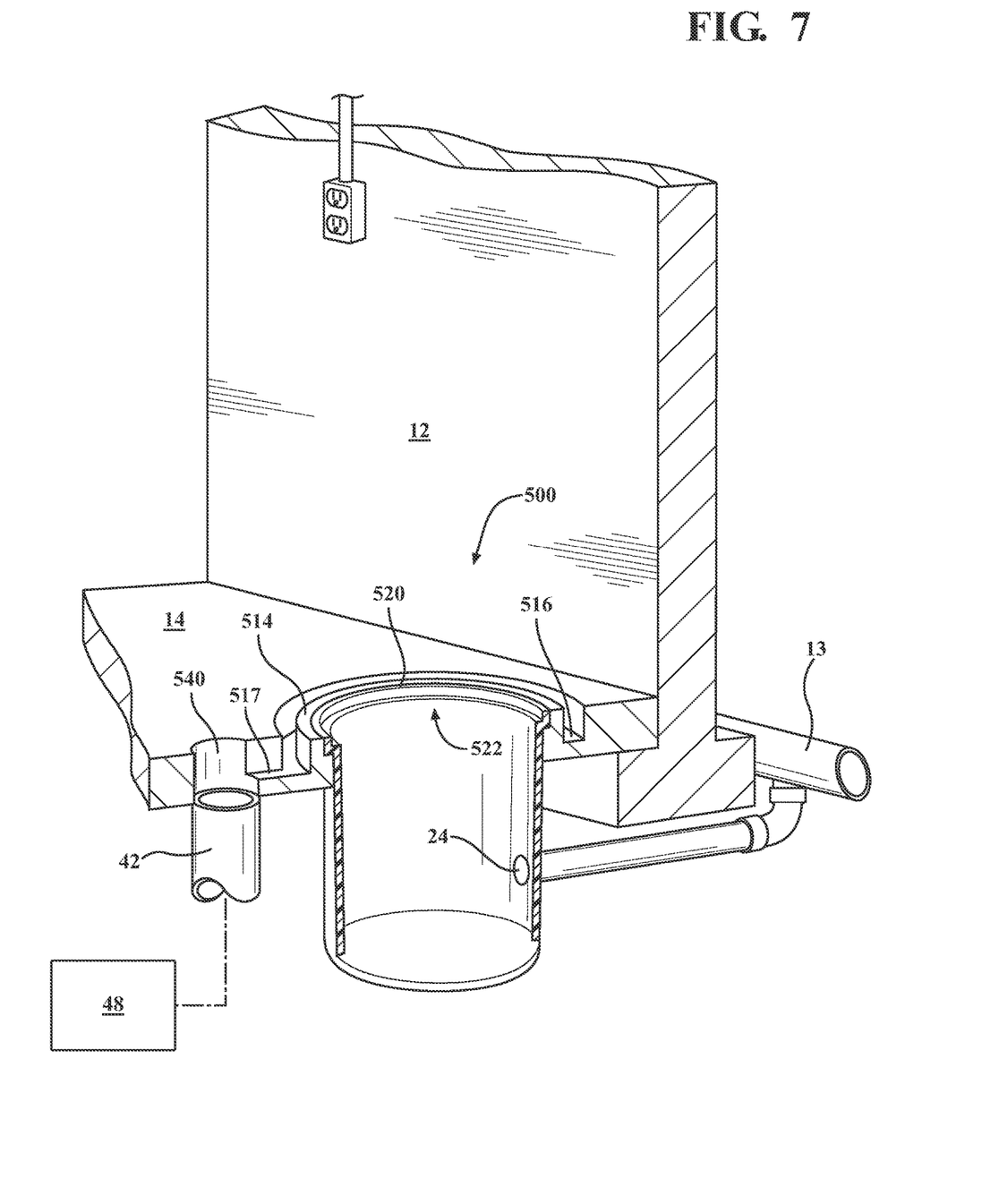
FIG. 7 a partial, cross-section perspective view of a sump including a collar trough, circumscribing the sump for directing water overflowing from the sump to the drainage field via a drain in the floor.
Figure 8:
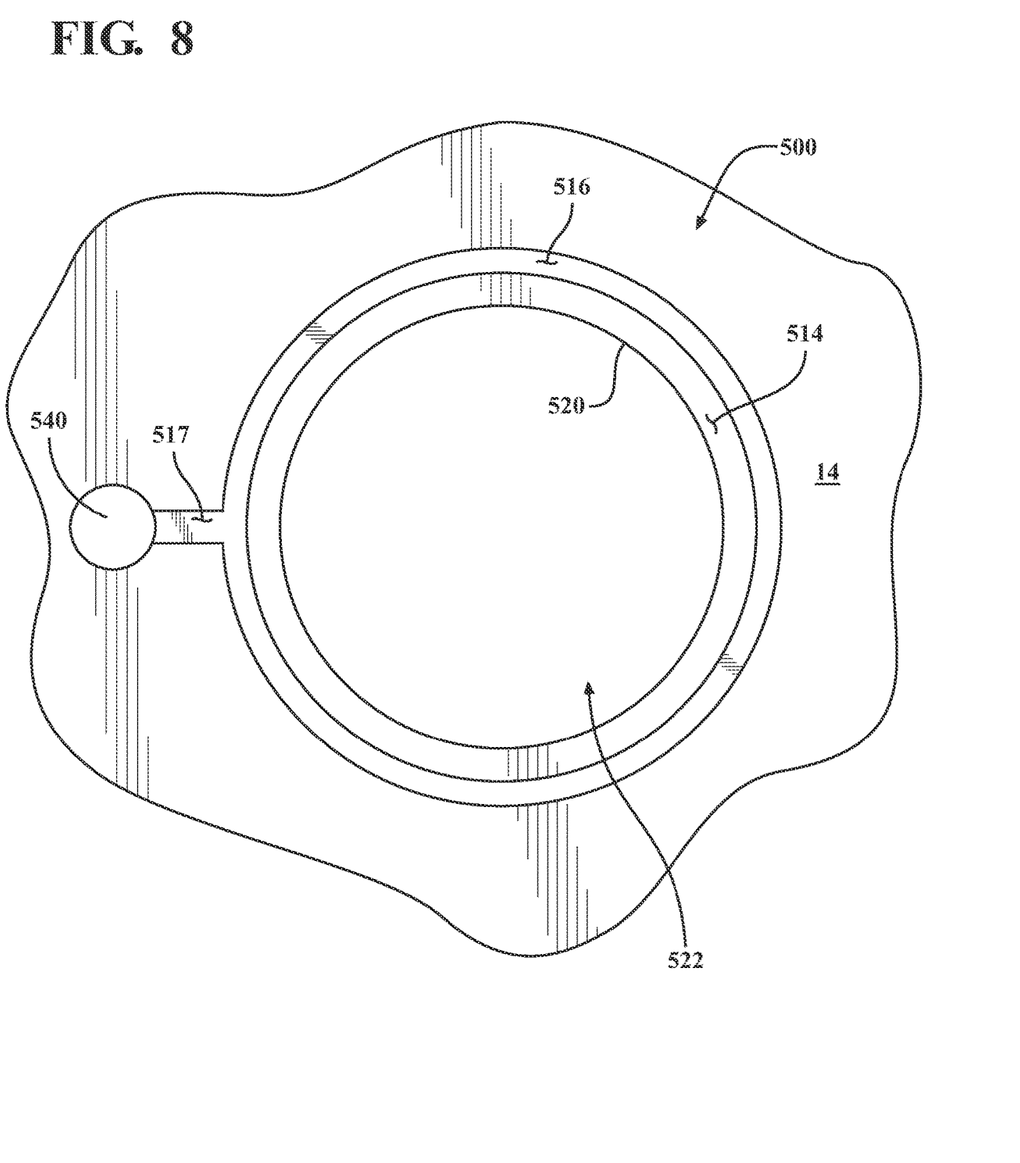
FIG. 8 is a top, plan view of the sump of FIG. 7.

Referring now to FIGS. 7 and 8 there is disclosed a sump overflow system 500. Like reference numbers from other figures are carried forward and used herein without repetition. The sump overflow system 500 includes a sump 520 installed in the floor 14 of the building 12 that has an encircling trough ring 516 located proximal an opening 522 of the sump 520. The trough ring 516 is formed in the cement of the floor 14 and defines a floor ring 514 between the sump 520 and the trough ring 516. The bottom of the trough ring 516 is located below the surface of the floor 14. Water which overflows out of the opening of the sump 520 will first flow over the floor ring 514 and then collects in the trough ring 516 which directs the flow of the overflowing water around the sump and toward the trough leg 517 which extends from the trough ring 516 to an outlet 540 where the water may be directed to flow into the outlet 540 and to the drainage field or sewer system 48. As will be appreciated above, this embodiment includes the forming of the concrete of the floor 14 to include the trough ring 516 and trough leg 517 and will include the typical aspects of laying and forming concrete including the pitching of the surfaces to direct the water toward the outlet 540.

Figure 9:
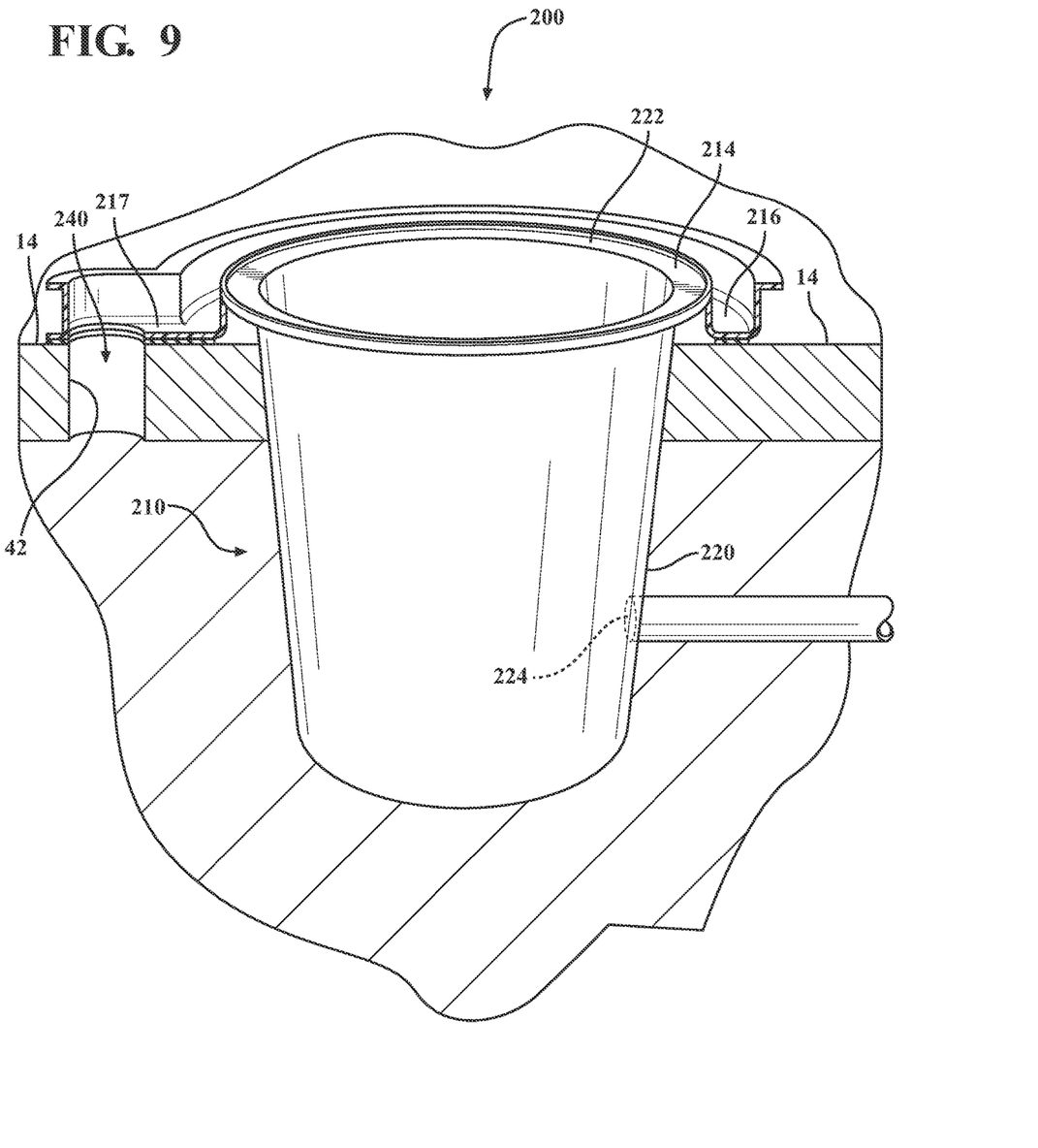
FIG. 9 is a partial, cross-section perspective view of a sump insert including an integral collar trough.

Referring to FIG. 9 there is a disclosed a sump overflow system 200 that includes a sump insert 210 including a sump crock portion 220 having an opening 222. Like the embodiment of FIGS. 7 and 8, the sump insert 210 includes an encircling trough ring 216 and a trough leg 217 formed as part of the sump insert 210. The sump insert 210 may be inserted in the floor 14 of the building. The sump insert 210 can be coupled to the sump inlet 224 where the sump water is conveyed into the sump 220. Again, if the water overflows the opening 222 of the sump insert 210 the water will cross a ring surface 214 and then flow into the trough ring 216 where it will be directed toward a trough leg 217 and then to the outlet 240 in the floor 14 and then to the drain field or sewer and away from the floor 14 and building. In this embodiment of the invention the opening 222 of the sump insert is above the surface of the floor. Additionally, the ring surface 214, trough ring 216 and trough leg 217 are all located above the surface of the floor 14.

Figure 10A:
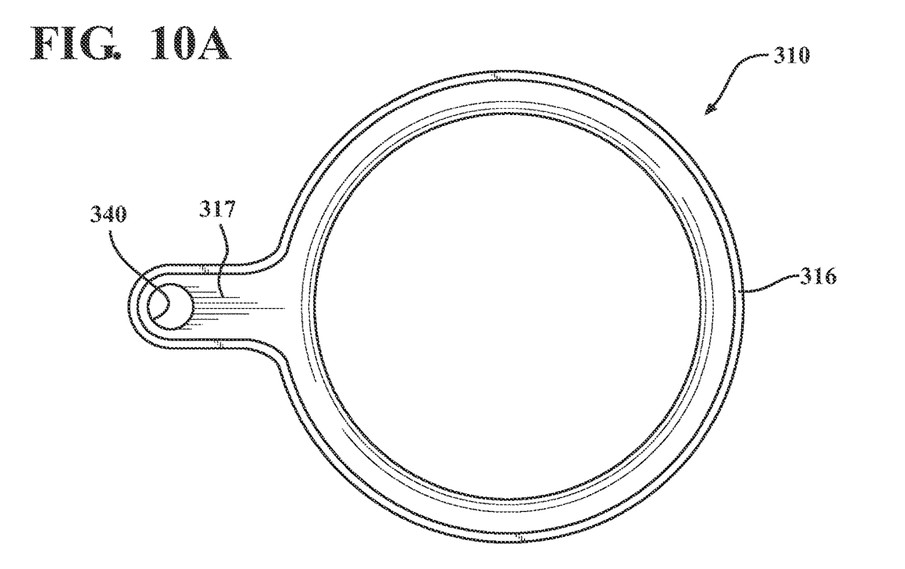
FIG. 10A is a top plan view of a sump overflow insert including an above ground trough for directing overflow water from the sump to a drain.
Figure 10B:
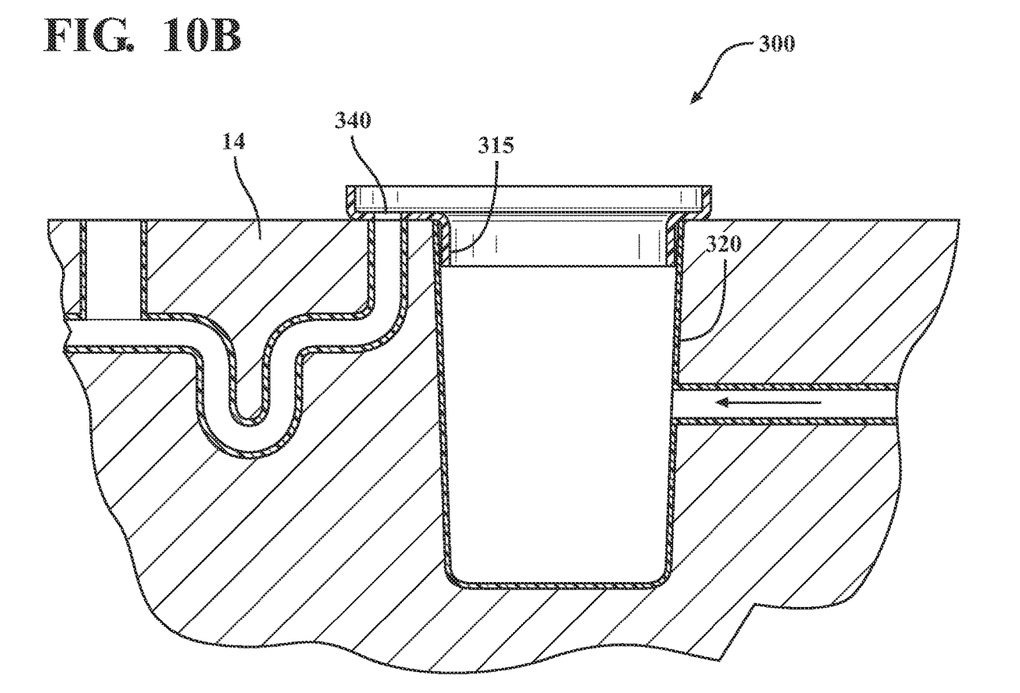
FIG. 10B is a partial, cross-section view of the sump overflow insert including an above ground trough for directing overflow water from the sump to a drain.

Referring to FIGS. 10A and 10B a sump overflow system 300 is shown and includes a sump insert 310. The sump insert 310 is like the sump insert 210 except in the present embodiment of the invention the sump insert 310 is not integrated with a sump 320. Instead, the sump insert 310 is designed to sit above the floor 14 and has a lip 315 that inserts into the sump portion 320. The sump insert 310 includes an open ring 316 coupled to a leg 317 for directing overflowing water from the sump 320 to an outlet 340.

Figure 11A:
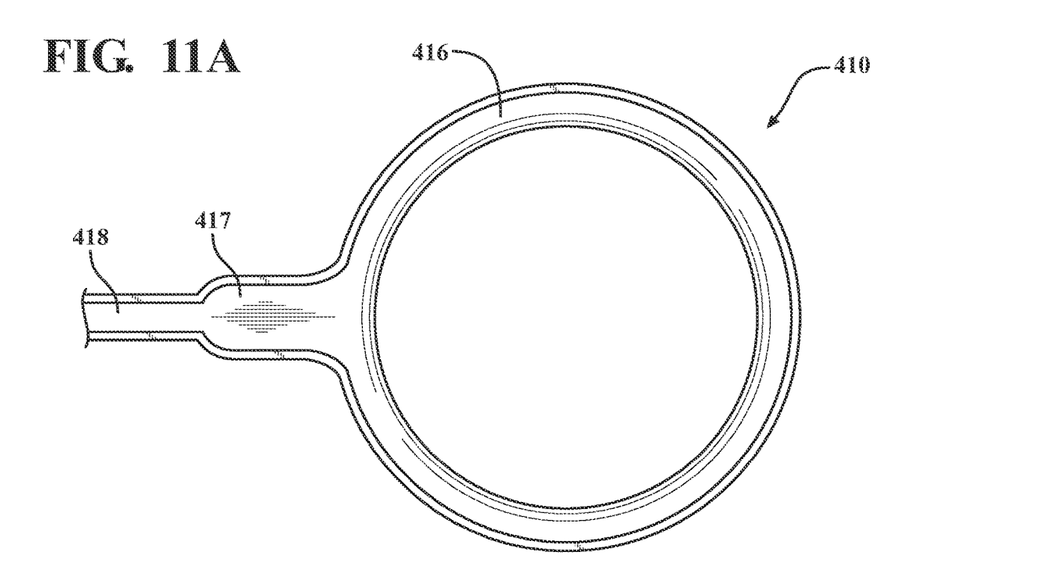
FIG. 11A is a top view of a sump overflow insert including an above ground through for directing overflow water from the sump to a drain.
Figure 11B:
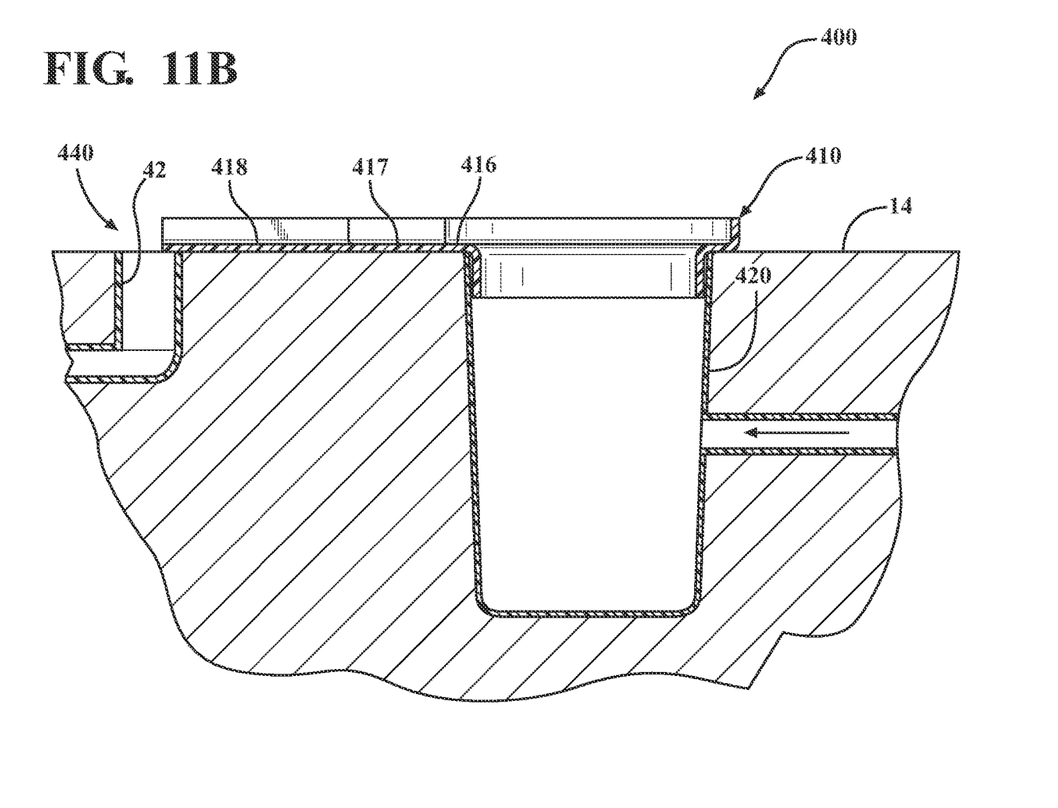
FIG. 11B is a partial, cross-section view of sump overflow insert including an above ground trough for directing overflow water from the sump to a drain.

Referring to FIGS. 11A, 11B a sump overflow system 400 is shown that includes a sump insert 410. The sump insert 410 is like the sump insert 310 in that it is also not integrated with a sump portion 420, although it may be integrated with it just like the sump insert 210. The sump insert 410 is also designed to sit above the floor 14 and includes an open ring 416. The sump insert 410 may include a leg 417 for directing overflowing water from the sump 420 to an outlet 440. The sump insert 410 may include an opening in the leg 417 for coupling with a hose or other conduit 418 for conveying the water to from an overflowing sump 420 to an outlet 440. The sump insert 410 works best where the outlet 440 is not located sufficiently proximal the sump 420 such that the leg 417 may be coupled directly to the outlet. The conduit 418 can have any length depending on the distance to the outlet 440.

Any numerical values recited herein or in the figures are intended to include all values from the lower value to the upper value in increments of one unit if there is a separation of at least 2 units between any lower value and any higher value. As an example, if it is stated that the amount of a component or a value of a process variable such as, for example, temperature, pressure, time, and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless expressly stated, all ranges are intended to include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The use of the term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps. By use of the term "may" herein, it is intended that any described attributes that "may" be included are optional.

The disclosure of "a" or "one" to describe an element, ingredient, component, or step is not intended to foreclose additional elements, ingredients, components, or steps. Plural elements, ingredients, components, or steps can be provided by a single integrated element, ingredient, component, or step. Alternatively, a single integrated element, ingredient, component, or step might be divided into separate plural elements, ingredients, components, or steps.

It is understood that the present description is intended to be illustrative and not restrictive. Many embodiments as well as many applications besides the examples provided will be apparent to those of skill in the art upon understanding the present disclosure. The scope of the claimed invention should, therefore, not be determined with limiting reference to the description, but should instead be determined with reference to the appended claims, along with the full scope of equivalents to which the claims are entitled. Any disclosure of an article or reference, including patent applications and publications, is incorporated by reference herein for all purposes. Any omission in the following claims of any aspect of subject matter disclosed herein is not a disclaimer of such subject matter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sump overflow system for use in a building having a floor and a drainage filed for collecting water from the perimeter of the building, the sump overflow system comprising:
    a sump crock located in the floor of the building and having an opening proximal a surface of the floor, the sump crock having an inlet for receiving water collected from the drainage field;
    a sump insert having a crock portion that slides into the sump crock and receives water from the inlet, the sump insert has an encircling trough ring that circumscribes an opening of the sump insert and is separated from the opening by a ring surface the circumscribes the opening, the sump insert further includes a trough leg connected to the encircling trough ring such that the sump insert, trough ring, ring surface and trough leg are all integrally formed together, wherein when water overflows the opening of the sump insert, the water will cross the ring surface and flow into the trough ring, through the trough leg and into an outlet.

2. The sump overflow system of claim 1 wherein the conduit includes a trap located between the opening of the conduit and the sewer system.

3. The sump overflow system of claim 1 further comprising a backflow valve coupled to the conduit.

4. The sump overflow system of claim 3 wherein the conduit is separate from a conduit for a sump pump.

5. The sump overflow system of claim 1 wherein the conduit is separate from a conduit for a sump pump.

6. The sump overflow system of claim 5 wherein the conduit includes a trap located between the opening of the conduit and the sewer system.

* * * * *